United States Patent [19]
Chodzko

[11] 3,928,817
[45] Dec. 23, 1975

[54] MULTIPLE-SELECTED-LINE UNSTABLE RESONATOR

[75] Inventor: Richard A. Chodzko, Palos VErdes Peninsula, Calif.

[73] Assignee: The United States of America as represented by the Secretary of the Air Force, Washington, D.C.

[22] Filed: Aug. 29, 1974

[21] Appl. No.: 501,728

[52] U.S. Cl............................................ 331/94.5 C
[51] Int. Cl.² ....................................... H01S 3/082
[58] Field of Search..................... 331/94.5; 356/106

[56] References Cited
UNITED STATES PATENTS
3,611,181  10/1968   Lary et al...................... 331/94.5 C

*Primary Examiner*—William L. Sikes
*Attorney, Agent, or Firm*—Joseph E. Rusz; George Fine

[57] ABSTRACT

An unstable resonator is provided which permits multiple selected line operation and also transverse mode control and arbitrary mode volume associated with an unstable cavity.

3 Claims, 3 Drawing Figures

MULTIPLE-SELECTED-LINE UNSTABLE RESONATOR

BACKGROUND OF THE INVENTION

A conventional technique for line selection in an optical resonator is to use a diffraction grating as an internal dispersive optical element. The grating is placed at the Littrow angle such that the first order radiation is reflected back on itself along the optical axis of the cavity. The output may be coupled, for instance, through a partially transmitting mirror or through the zero order reflection of the grating. Previously, this method of line selection was used with stable resonators. Recently it was applied successfully to an unstable resonator on a CW HF chemical laser. The unstable resonator has the advantage of good transverse mode selection and an arbitrary mode volume, while the stable resonator is limited to small mode volumes with a diameter of the order of $\lambda L$ ($L$ = length of cavity, $\lambda$ = wavelength of radiation) for single transverse mode operation. In certain situations it may be desirable to operate on more than one selected line as, for example, in a CW chemical laser where significant power is available on several vibrational-rotational transitions. Multiple selected line operation may also be useful in atmospheric transmission applications and for studies of rotational-cross relaxation rates in a multiline molecular laser. In addition to multiple selected line operation, it is desirable to have the transverse mode control and arbitrary mode volume associated with an unstable cavity. The present invention combines the above two concepts (one or more selected line operation and an unstable cavity) in a single device.

SUMMARY OF THE INVENTION

A new type of unstable resonator is provided which permits multiple-selected line operation. Selected line operation is obtained with a diffraction grating oriented at an angle different from the Littrow angle. Secondary feedback mirrors at the appropriate angles provide an independent three element cavity for each wavelength selected. Each three element cavity can be length tuned for line center operation for each selected wave length separately. The off-Littrow configuration is less efficient than a single line cavity at the Littrow angle since there are secondary zero order beams at each wavelength in addition to a primary zero order beam at all selected wavelengths. The loss of power to the secondary zero order beams can be reduced, however, by using a grating of low efficiency which produces optimum output in the primary zero order beam for a high gain laser.

Two types of multiple-selected line unstable resonators are utilized; (1) an edge coupled design which produces an annular beam with a 45° output coupling mirror, and (2) a continuously coupled design which utilizes the primary zero order beam as output with a 45° coupling mirror. The three element selected line cavities allow for confocal unstable designs which produce parallel output beams. The edge coupled multiple selected line configuration has a maximum output power with a grating of high efficiency while the continuously coupled configuration has an optimum grating efficiency for maximum power.

DESCRIPTION OF THE DRAWING

FIG. 1$b$ illustrates a continuously coupled multiple-selected line unstable resonator.

DETAILED DESCRIPTION OF THE PREFERRED EMBODIMENT

Figure 1A:
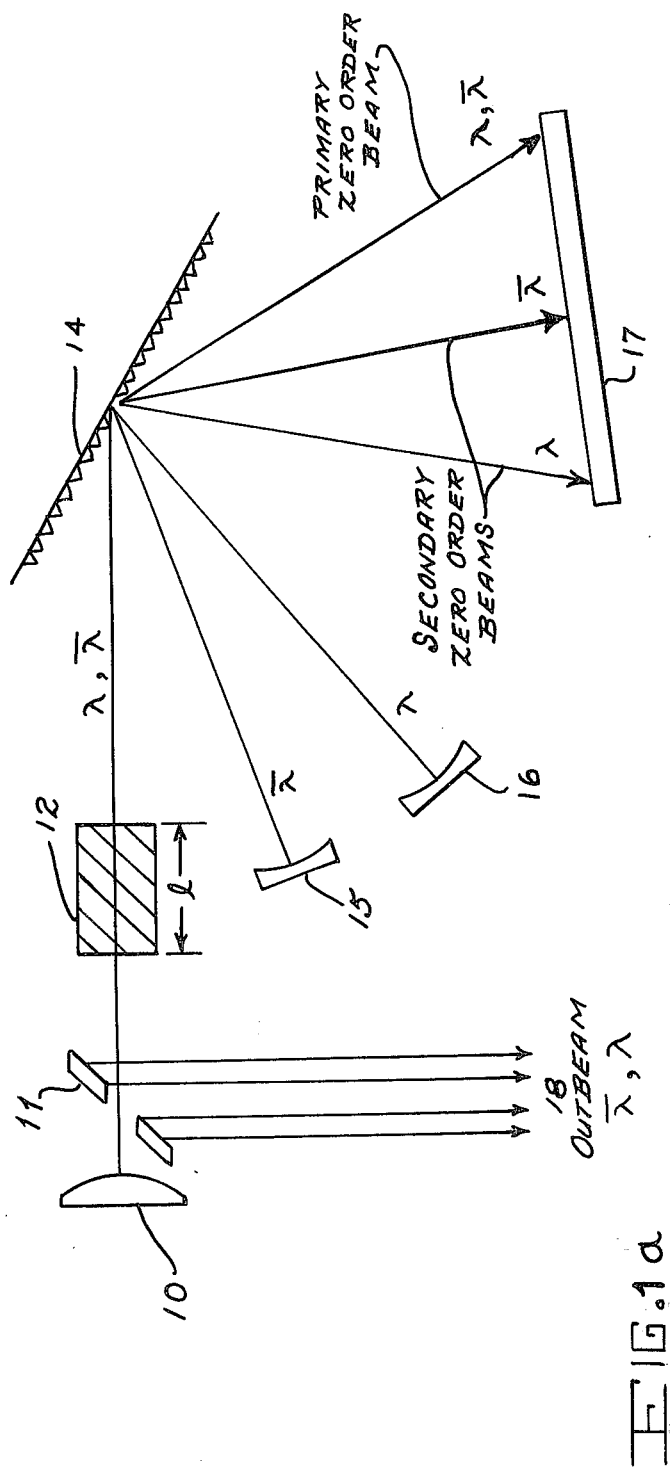
FIG. 1$a$ illustrates an edge coupled design of a multiple-selected line unstable resonator.

Now referring to FIGS. 1$a$ and 1$b$, there is shown the device which combines one or more selected line operations and an unstable cavity. The device, and its operation, is discussed in detail hereafter.

Now referring to FIG. 1$a$, there is shown an edge coupled device being comprised of total reflector 10 each having a radius of $R_1$, 45° output coupling mirror 11, active region 12 having length, l, diffraction grating 14, total reflectors 15 and 16 having radius $R_2$ and absorbing plate 17. Output beam 18 is provided by way of output coupling mirror 11.

Now referring to FIG. 1$b$, there is shown a continuously coupled device being comprised of total reflector 10$a$ having radius $R_1$, active region 11$a$ having length l, diffraction grating 14$a$, total reflectors 15$a$ and 16$a$ each having a radius of $R_2$, and absorbing plate 17$a$. Output beam 18$a$ is provided by way of diffraction grating 14$a$.

Diffraction gratings 14 and 14$a$ shown in FIGS. 1$a$ and 1$b$, respectively, are operated in an off-Littrow configuration. It is noted that in a Littrow configuration, $r_1 = i = i_L$, $r_0 = -i_L$. The Littrow angle $i_L$ for a given wavelength is given by $$\sin i_L = \lambda/2d \quad (1)$$

where $d$ is the groove spacing of the diffraction grating. The groove spacing d of the diffraction grating is further limited by the condition $0.5\lambda \leq d \leq 1.5\lambda$ to ensure that only zero and first order reflections exist. Angles are defined with respect to the surface normal. If radiation is incident at an angle $i$ different from $i_L$, a zero order beam is reflected in the direction $r_0 = -i$ and first order radiation is reflected at an angle $r_1$ given by $$\sin r_1 = (\lambda/d) - \sin i \quad (2)$$

If $i$ is greater or less than $i_L$ then $r_1$ will be less or greater than $i$. Thus if a secondary feedback mirror is placed at an angle $r_1$ corresponding to $\lambda$ as seen in FIGS. 1$a$ and 1$b$, a three element cavity is formed (off Littrow configuration). Another secondary feedback mirror at an angle $\bar{r}_1$ corresponding to $\bar{\lambda}$ forms a second three element cavity, and so on. It is clear that each of the three element cavities are independent, their lengths can be independently controlled and tuned to line center corresponding to both $\lambda$ and $\bar{\lambda}$.

A blazed diffraction grating used in the Littrow configuration has a certain efficiency $N \cdot (\lambda)$ which is defined as the fraction of incident radiation flux of wavelength $\lambda$ reflected into the first order. Thus $$N = I_{r_1}/I_i \quad (3)$$

For an ideal grating there is no loss of power between orders so that the fraction of incident flux reflected into the zero order is given by $$I_{r_0}/I_i = 1 - N \quad (4)$$

in the Littrow configuration. In the off-Littrow configuration on the other hand, the fraction of incident flux reflected into the first order along the optical axis is given by $$I_{r_1'}/I_i = N^2 \quad (5)$$

the fraction of flux reflected into a primary zero order beam at an angle $r_o = -i$ is given by $$I_{r_0}/I_i = 1 - N \qquad (6)$$

and the fraction of flux reflected into a secondary zero order beam at an angle $r_o' = -r_1$ is given by $$I_{r_0}/I_i = N(1 - N) . \qquad (7)$$

This assumes that the efficiency $N$ does not vary significantly with reflection angle over the wavelength range of interest. Thus, when two wavelengths $\lambda$ and $\bar{\lambda}$ are selected in the off-Littrow configuration, there will be a primary zero order beam containing both $\lambda$ and $\bar{\lambda}$ radiation in the $r_o = -i$ direction and two secondary zero order beams in the $r_o'(\lambda)$ and $r_o'(\bar{\lambda})$ directions containing only $\lambda$ and $\bar{\lambda}$, respectively.

FIG. 1a shows the off-Littrow configuration applied to an edge coupled positive branch confocal unstable resonator. The concept of course also applies to a nonconfocal unstable resonator. The total cavity length L is the sum of the distances between convex mirror 10 and blazed diffraction grating 14 and between grating 14 and concave mirrors 15 and 16. The radii of curvature of the mirrors are related to the cavity length by $R_1+R_2 = 2L$ for a confocal cavity. Output beam 18 in this configuration is coupled with 45° mirror 11 with a hole drilled at a 45° angle parallel to the optical axis as done previously in the prior art. The output is in the form of a parallel annular beam, and the direction of the output beam is independent of the selected wavelengths $\lambda$ and $\bar{\lambda}$. The zero order radiation in this case is dumped into absorbing plate 17 and represents wasted power. Thus, the optimum grating efficiency is unity for maximum power output. At a grating efficiency near unity the power in the secondary zero order beams is nearly equal to the power in the primary zero order beam as seen from Equations (6) and (7).

Figure 1B:
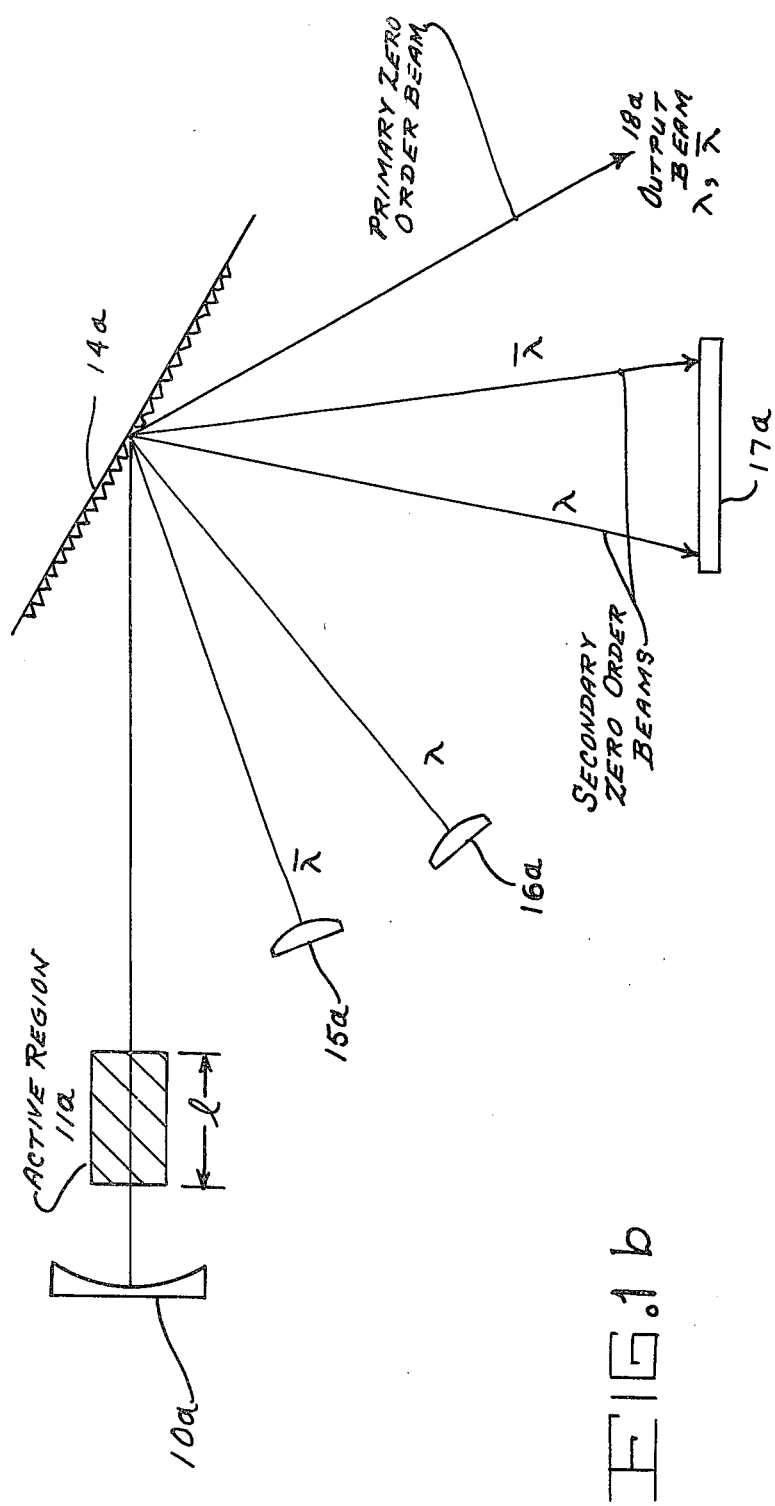
Figure 2:
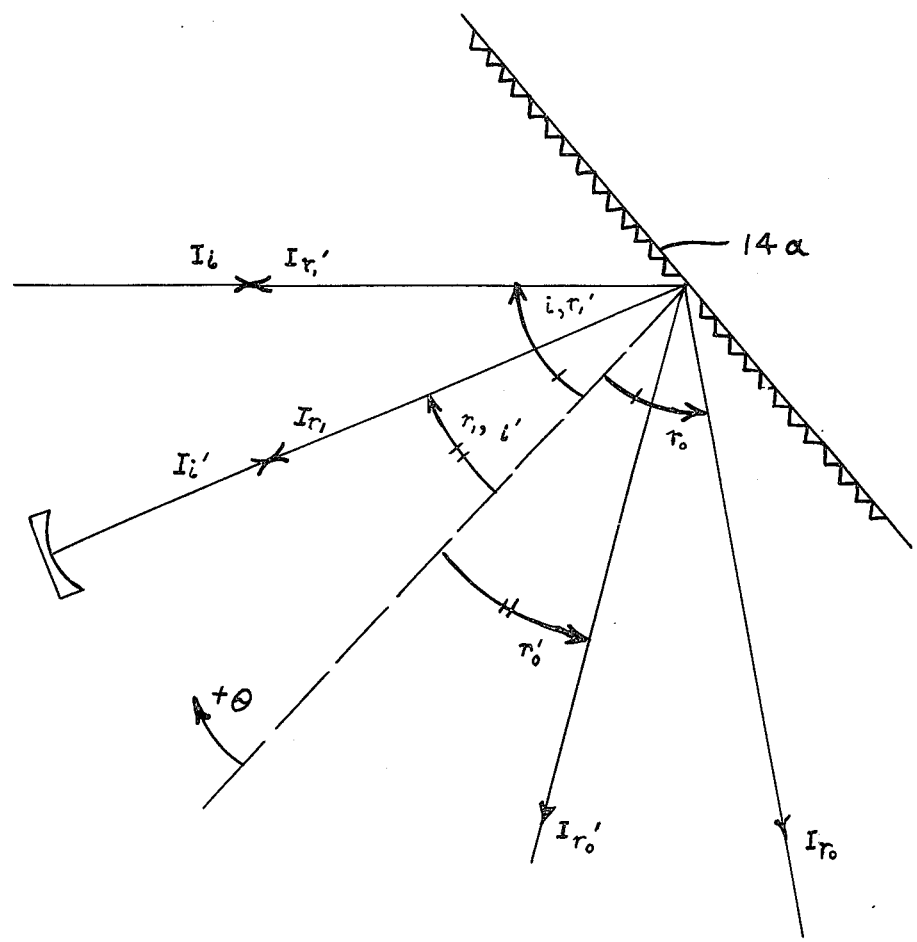
FIG. 2 shows the angles and intensities associated with wavelength $\lambda$ in FIG. 1$b$.

FIG. 1b shows the off-Littrow configuration applied to a continuously coupled positive branch confocal unstable cavity. This configuration applies to any resonator stable or unstable. The resonator is similar to FIG. 1a except the 45° output coupling mirror is deleted. The output in this configuration is the primary zero beam which contains both $\lambda$ and $\bar{\lambda}$ radiation. Again the confocal condition $R_1 + R_2 = 2L$ implies a parallel output beam. The direction of the output beam is independent of the selected wavelengths $\lambda$ and $\bar{\lambda}$ for a fixed grating orientation or angle of incidence $i$. The secondary zero order beams represent wasted power dissipated in absorbing plate 17a as shown in FIG. 1b. In some applications such as monitoring the output power, the secondary zero order beams may be useful. There is an optimum grating efficiency for maximum power in this configuration which depends on the zero power gain of each wavelength $g_ol$ (l = length of gain region) the grating efficiency $N(\lambda)$ and the magnification M of the unstable resonator. It can be shown that increasing values of $g_ol$ imply decreasing values of $N(\lambda)$ for optimum power output. Thus in the limit of large values of $g_ol$, equations (6) and (7) show that most of the output power will be concentrated in the primary zero order beam. This implies that the device (FIG. 1b) may be useful in high power applications. FIG. 2 shows the angles and intensities associated with wavelength $\lambda$ in the FIG. 1b.

Optical resonators similar to FIGS. 1a and 1b were evaluated experimentally on an arc driven CW HF laser. The resonator was set for selected line operation on the $P_1(6)$ ($\lambda = 2.707\mu$) and the $P_2(5)$ ($\lambda = 2.795\mu$) HF transitions simultaneously. A 600 line/mm interferometrically ruled, water cooled master grating was used with a $2.80\mu$ blaze angle. The grating efficiency was measured to be $N(2.795\mu) = 0.80$ with 10 percent in the zero order and 10 percent lost between orders due to imperfect groove shape. A nonconfocal unstable cavity in the off-Littrow configuration consisting of a 51 m radius convex mirror, the diffraction grating, two flat total reflector secondary feedback mirrors and a 2.62 m cavity length was used. Both edge coupling and continuous coupling was applied. For the case of continuous coupling the spectral content of the primary zero order beam was measured with a P and E monochrometer and the power output was measured with a CRL power meter. The power output was measured with the $P_2(5)$ feedback mirror alone, the $P_1(6)$ mirror alone and with both the $P_2(5)$ and $P_1(6)$ feedback mirrors. The power output levels obtained were 27W, 2W and 33W respectively showing an expected enhancement in power due to cascading of the vibrational levels of the HF molecule. The lines were identified with the monochrometer when both feedback mirrors were used as only $P_2(5)$ and $P_1(6)$ at 2.795 and 2.707 microns respectively.

What is claimed is:

1. A multiple-selected-line unstable resonator comprising a first total reflector having a first predetermined radius, $R_1$, a blazed diffraction grating displaced from said first total reflector and positioned at an off-Littrow angle therefrom, an active region having a predetermined length and being positioned between said first total reflector and said blazed diffraction grating, a 45° mirror having a hole with a longitudinal axis at a 45° angle with respect to the mirror surface, said 45° mirror disposed between said first total reflector and said active region to provide an output beam, in the recited sequence, said first total reflector, said 45° mirror, said active region, and said blazed diffraction grating being in optical alignment, second and third total reflectors displaced from said blazed diffraction grating at first and second predetermined angles of $r_1$ and $\bar{r}_1$, respectively, said third total reflector being adjacent to said second total reflector, each of said second and third total reflectors having a second predetermined radius of $R_2$, a cavity with a total length, L, being the sum of the distances between said first total reflector and said blazed diffraction grating and between said blazed diffraction grating and said second and third total reflectors, the radii of curvature of said total reflectors being related to said cavity length, L, by $R_1 + R_2 = 2L$, an absorbing plate displaced from said blazed diffraction grating at a third predetermined angle, $r_o$, said absorbing plate being adjacent to said third total reflector and operating to absorb secondary zero order beams received from said diffraction grating.

2. A multiple-selected-line unstable resonator as described in claim 1 wherein said first total reflector consists of a concave mirror and said second and third total reflectors of second and third convex mirrors, respectively.

3. A multiple-selected-line unstable resonator comprising a first total reflector having a predetermined radius, $R_1$, a blazed diffraction grating displaced from said first total reflector and positioned at an off-Littrow angle therefrom, said blazed diffraction grating providing a primary zero order output beam at a first predetermined angle, an active region having a predetermined length and being positioned between said first total reflector and said blazed diffraction grating, in the recited sequence, said first total reflector, said active region, and said blazed diffraction grating being in optical alignment, second and third total reflectors displaced from said blazed diffraction grating at second and third predetermined angles of $r_1$ and $\overline{r}_1$, respectively, said third total reflector being adjacent to said second total reflector, each of said second and third total reflectors having a second predetermined radius, $R_2$, a cavity with a total length, L, being the sum of the distance between said first total reflector and said blazed diffraction grating and said second and third total reflectors, the radii of curvature of said total reflectors being related to said cavity length, L, by $R_1 + R_2 = 2L$, and an absorbing plate displaced from said diffraction grating at a fourth predetermined angle, $r_0$, said absorbing plate being adjacent to said third total reflector and operating to absorb secondary zero order beams received from said diffraction grating.

* * * * *